F. G. LYONS.
FOLDING CART.
APPLICATION FILED NOV. 1, 1907.
908,472.
Patented Jan. 5, 1909.
2 SHEETS—SHEET 1.
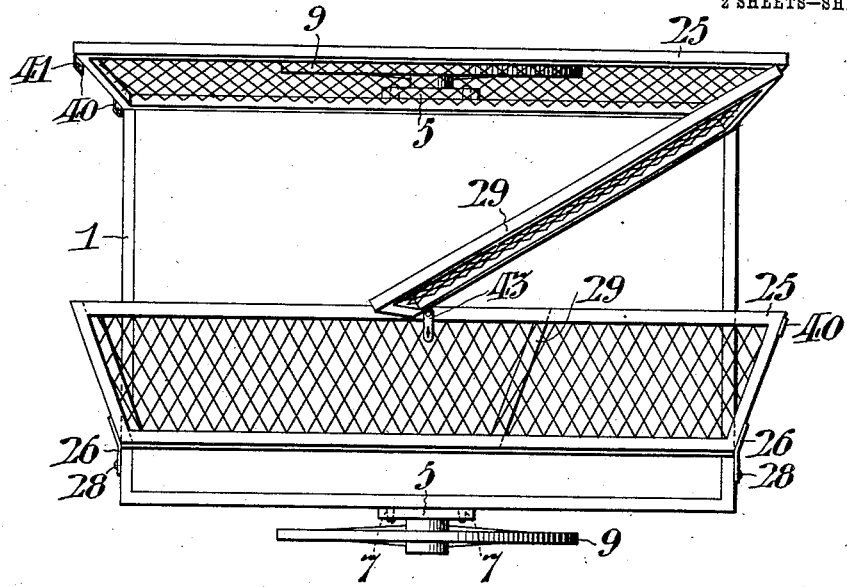
FIG. I.
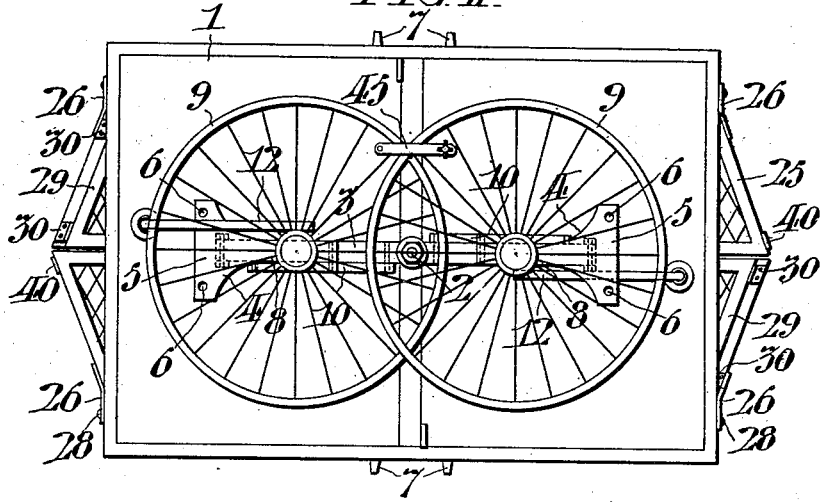
FIG. II.
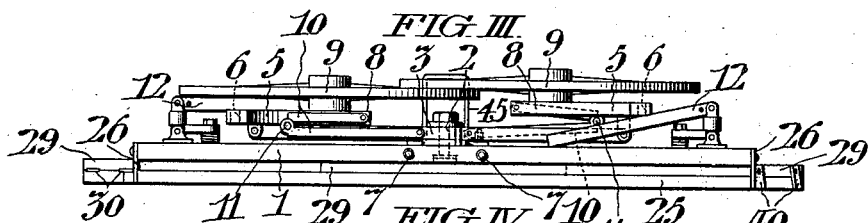
FIG. III.
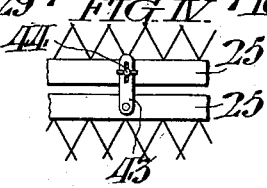
FIG. IV.
WITNESSES:
John C. Bergner
Wm. J. Sperl
INVENTOR:
FRANK G. LYONS,
by his attorneys
Tulley & Paul F. G. LYONS.
FOLDING CART.
APPLICATION FILED NOV. 1, 1907.
908,472.
Patented Jan. 5, 1909.
2 SHEETS—SHEET 2.
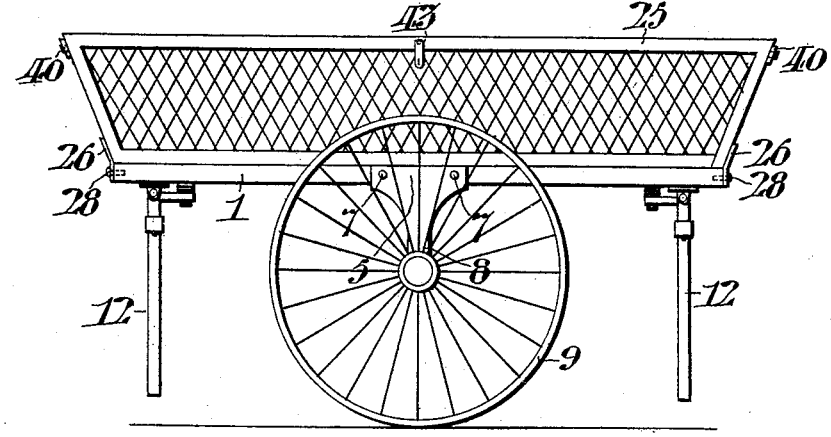
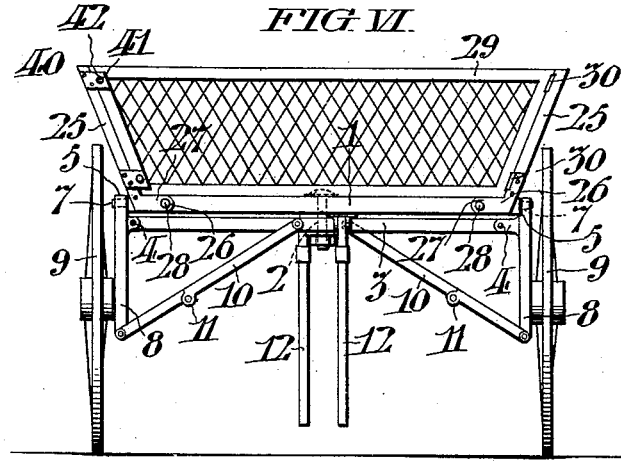
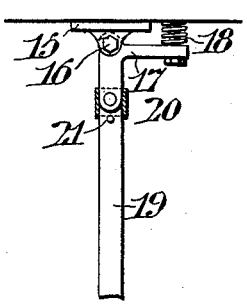
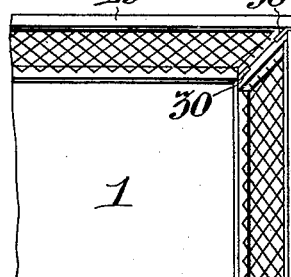
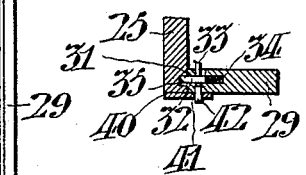
WITNESSES:
John C. Bergner
Wm. J. Spell
INVENTOR:
FRANK G. LYONS,
by his Attorneys

UNITED STATES PATENT OFFICE.

FRANK G. LYONS, OF PHILADELPHIA, PENNSYLVANIA.

FOLDING CART.

No. 908,472.    Specification of Letters Patent.    Patented Jan. 5, 1909.

Application filed November 1, 1907. Serial No. 400,256.

*To all whom it may concern:*

Be it known that I, FRANK G. LYONS, of Philadelphia, in the county of Philadelphia and State of Pennsylvania, have invented certain new and useful Improvements in Folding Carts, whereof the following is a specification, reference being had to the accompanying drawings.

My invention relates to a folding or collapsible cart, light and strong in structure, and so constructed that the folding or unfolding operation may be readily performed by a single person. Such a light and strong collapsible cart may be employed as an adjunct to an ordinary delivery wagon, and may be carried therein and used to supplement its work. My folding cart is especially adapted to such work.

In the accompanying drawings, Figure I, is a plan view of a delivery cart embodying my invention, illustrating the process of folding its walls. Fig. II, is a view of such cart from beneath after folding. Fig. III, is a side elevation of the folded cart. Fig. IV, is a detail of the catch employed for securing together the folded sides. Fig V, is a side elevation of the cart as opened for use. Fig. VI, is a similar end elevation. Figs. VII, VIII, and IX, are detailed views showing the construction of smaller parts.

The base 1, of the cart is provided centrally with a king bolt 2, upon which is pivoted the swivel-board 3, having a length corresponding substantially to the width of the base of the cart. To each end of this swivel-board is hinged a folding bracket 4, the preferred details of the hinging joint sufficiently appearing from the drawings. Each of these hinged brackets comprises an upwardly extended portion 5, pierced by apertures 6, 6, which when the wagon is adjusted for use, are in engagement with pins 7, 7, on the side of the base of the cart. Each bracket further comprises a downwardly depending portion 8, to which is pivoted the wheel 9. The lower end of the bracket is further connected with the swivel-board by a brace 10, provided with a knuckle-joint 11, by the breaking of which the bracket with its wheel may be folded into parallel relation with the swivel-board. When the knuckle-joint is set, the bracket is firmly braced in its vertical position, being held both at its lower end by its brace, and at its upper end by engagement of its apertures 6, 6, with the pins on the side of the wagon. Upon comparing the two brackets it will be observed that the hinges whereby they are pivoted to the ends of the swivel-board are of differing projection whereby one of said brackets may be folded slightly beneath the other thus effecting their folding in parallel relation to each other.

The base of the cart is further provided at both ends with a pivoted strut 12. This strut may be allowed to swing freely in both directions, but I prefer to construct it as illustrated in Fig. VII, wherein it comprises a base 15, with a pivot pin 16, carrying a bell crank lever 17, the horizontal arm of which is connected with the base by a strong coiled spring 18. The vertical arm of the lever has pivoted to its extremity the post 19. A collar 20, is provided, which fits over this pivoted joint and falls into position to stiffen it when the strut is in vertical position, the further descent of the collar being prevented by pin 21. When the cart is collapsed the collar 20, falls away from the pivot joint, and allows the base or leg of the strut to be folded flat against the base of the cart, as shown in Figs. II, and III. A strut of the character described not only serves to maintain the two wheeled cart in horizontal position when standing unsupported, but assists in wheeling the cart up a step or curb, since the front end of the cart can be momentarily supported on the strut, which, as the cart is pushed forward, will yield and assist the wheel to mount the curb. Of course, it will be understood that any convenient strut or support may be substituted for the one which I have shown and described.

The box portion of my cart consists of two sides 25, each hinged at each end to the base 1. Each hinge is formed by an angle plate 26, secured to the end of the side 25, and having its horizontal arm 27, provided with a hole through which the bolt 28, passes into the base 1. By thus hinging the sides 25, they are raised above the top face of the base 1, sufficiently to give room for the infolded end pieces 29, and allow them to rest flatly upon said base when the cart is collapsed. Each end piece 29, is hinged at one end to a side piece 25, by means of common hinges 30, in such manner that it may fold beneath the side when the latter is folded against the base of the cart, the method of hinging the sides to the base being such as to permit this, as shown in Fig. VI.

When the sides and ends are opened they are locked in proper position by means of spring catches 31. Each catch comprises a bolt 32, having a finger pin 33, and pressed outwardly by a spring 34, held within the end of the cart. The outer end of said bolt 32, is beveled as is common in spring catches, and enters a recess 35, in the inner face of the coöperating side of the cart.

To maintain the sides 25, in proper relation with the end pieces 29, each side is provided at one end with a plate 40, having a hole 41, for the reception of a pin 42, projecting beyond the outer face of each end piece 29. This construction keeps the sides from dropping outwardly; and the spring catches keep the ends from moving inwardly and thereby maintain the pins 42, in the holes 41.

When the sides of the cart are collapsed, they are united or buckled together in their folded position by means of the metal strap 43, pivoted to one side, and secured to the other by the thumb screw 44. In like manner, when the wheels have been folded beneath the base by the breaking of the knuckle-joints of their braces, the two are secured in place after the swivel-board has been swung to its longitudinal position by means of the strap 45, on the base of the cart.

It will be observed that all the parts and constructions which I have described co-act to produce, when the parts are unfolded, a light but strong cart capable of carrying a considerable load; at the same time, the construction is such that the folding of the cart may be readily accomplished by a single person with the expenditure of very little strength. Accordingly, if a store delivery wagon be provided with one of these carts, it may, when folded, be carried therein without occupying much space, while, on the other hand, the delivery boy who accompanies the wagon may readily at a desired point open the cart and use it for a time to supplement the service of the wagon.

Having thus described my invention I claim:—

1. In a folding cart, the combination of the base; depending side brackets carrying wheels and having horizontal arms of different lengths, by which they are hinged, so as to fold in two planes under the base; together with braces pivotally connected to both brackets and the base, and provided with knuckle joints, by the breaking of which the folding in of the brackets is permitted.

2. In a delivery cart the combination of a swivel-board pivoted thereunder; depending brackets hinged to the swivel-board to swing inwardly at different levels; wheels pivoted to the brackets; and braces whereby the brackets may be held at right angles to the swivel-board.

3. In a folding cart the combination of a swivel-board pivoted to the lower side of the base; brackets carrying wheels and hinged near each end of the swivel-board; and means whereby when the swivel-board is swung transversely and the brackets swung to vertical position, the latter are caused to engage the sides of the base and held in position therewith by braces.

4. In a folding cart the combination of a base; a swivel-board pivoted to the lower side of said base; brackets carrying wheels and hinged near each end of the swivel-board; means on the body of the cart for engaging said brackets when swung to vertical position; and means comprising a knuckle joint for maintaining said brackets in vertical position.

5. In a delivery cart the combination of a base; a strut pivoted to said base, comprising a jointed arm and a sleeve for covering the joint to render it rigid; and a spring co-acting with said strut to maintain it in vertical position.

6. In a delivery cart the combination of a base; a swivel board pivoted thereunder; brackets pivoted to the swivel-board and having wheels mounted thereon; and braces comprising knuckle joints for maintaining the brackets at right angles to said swivel-board.

In testimony whereof, I have hereunto signed my name at Philadelphia, Pennsylvania, this twenty-ninth day of October, 1907.

FRANK G. LYONS.

Witnesses:
JAMES H. BELL,
E. L. FULLERTON.